Figure 1:
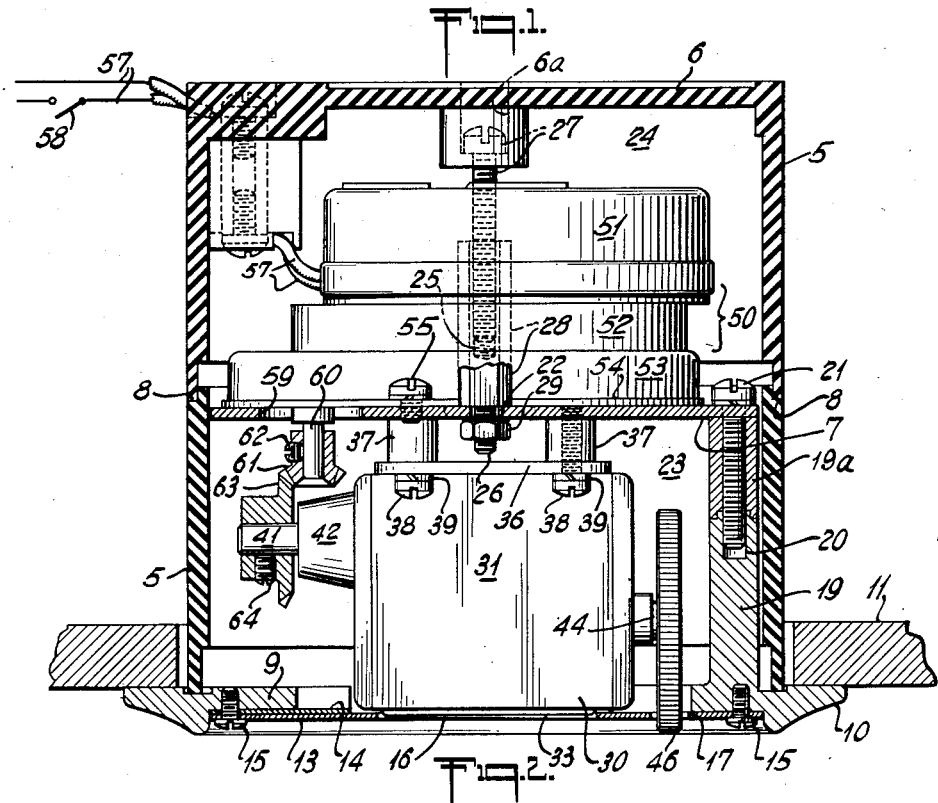

May 1, 1951      H. SPENCER      2,551,179

RUNNING-TIME METER

Filed Feb. 18, 1948

INVENTOR:
Hugh Spencer
BY Morrison, Kennedy & Campbell,
ATTORNEYS.

Patented May 1, 1951

2,551,179

UNITED STATES PATENT OFFICE 2,551,179

RUNNING-TIME METER

Hugh Spencer, Chester, Conn., assignor to The R. W. Cramer Company, Incorporated, Centerbrook, Conn., a corporation of Connecticut Application February 18, 1948, Serial No. 9,210

6 Claims. (Cl. 161—15)

This invention is a novel running-time meter or instrument adapted to indicate or measure the elapsed time of any given operation or of idle intervals between operations, the meter usually having a face dial or numbered device for visual observation of the indication of running or elapsed time, and usually also a manual means to reset the meter or device to a given starting or zero position.

The utility of the meter of this invention is to indicate the extent of elapsed time for any operation, event or condition requiring such indication; the meter being preferably such that it can be manually or at will started into measuring action and manually stopped at the end of the given running-time; although the meter may be adapted to operative coaction with the apparatus whose operation is being measured, the starting of the meter in that case being effected by the starting of the operation, or vice versa, and the stopping of the meter being the cause of the stopping of the operation, or vice versa. Such a meter is of advantage for various industrial and other operations and processes, in connection with any plant or system or machine; it is of value in the measurement of endurance or durability of apparatus or parts; also for readily determining the time, as by hours or minutes, of the operations of pumps or other machines, which is sometimes important in keeping track of the extent of use and therefore of the wear of the apparatus, for servicing purposes; also in laboratory work for determining the intervals of testing or like operations. In the electrical arts, an instance is the use of the invention as an adjunct to apparatus comprising vacuum tubes or other elements subject to deterioration, thereby to afford a continuous indication of the extent of use, and in some cases affording a guide for the replacement of parts before failure thereof. In the case of a furnace that operates intermittently the meter of this invention can count the minutes or hours or other time units of activity, the meter going and stopping as the furnace turns on and off, thus integrating the active intervals and showing by its number devices the totals at the end of a day, week, month or other period of time. With a five-number dial or display, the time units can be counted and indicated up to 100,000 units or counts, with repeat if required.

A general object of the invention is to provide a measuring instrument or register to indicate elapsed time efficiently and with convenience and accuracy; and at the same time to possess ruggedness in use, and simplicity and inexpensiveness in construction. In connection with such object it is a further object to permit the use in the meter hereof of certain standard marketed mechanisms or assemblies which, by special intercombination, cooperate in accordance with the principles of the invention. Another object is to provide a construction of the meter hereof in a form readily adaptable to mounting upon standard instrument panels, notably by positioning the instrument to extend through a hole in the panel, to be fixed or clamped there, with the front face or wall of the instrument substantially flush with the front wall of the panel; a related object being to meet the problem which exists with such instruments of overcoming the handicap of restricted space to accommodate the necessary parts and mechanisms, the invention providing extreme compactness of arrangement and assembly within a conventionally small enclosing frame or housing. An additional object of the invention, in connection with its use on an instrument panel, is to provide exterior front access to the means which serves to reset the indicating elements to a given initial or zero position.

Other and further objects and advantages of the invention will appear in the reading of the hereinbelow description; the invention consisting in the novel running-time meter and the novel features of operation, combination, construction and arrangement in this application illustrated or described.

The invention may be outlined as consisting of a mountable general frame which includes a walled housing, and a base plate or partition therein upon which the operative elements are mounted, and in combination therewith certain operating elements positioned within the housing. These elements include a readable mechanism or revolution counter of a standard kind, with particular characteristics, as will be described, with its number elements or series of disks exposed to front view, and the counter having a driving shaft substantially parallel to the housing front wall and preferably a shaft-operated means for resetting at will the indication of the counter. The meter comprises also, within the housing space, a synchronous electric motor of a standard kind, as will be further described, having its output shaft rotatable in synchronism with conventional clock time. These elements, the counter and the motor, are coordinated by a gearing or train extending from the motor output shaft to the counter driving shaft, so that, when the motor is put into action at the beginning of a given operation it will function through the counter mechanism to indicate the passage or progress of time during the continuance of some industrial or other operation or conditions, thereby attaining one of the main objects of the invention.

In a preferred form the counter is mounted in the front of the housing space in a manner to have its driving and resetting shafts substantially parallel to the meter face, while the mounting of the motor, in the back space, is such that its output shaft extends substantially at right angles to said driving shaft and to the meter face; this disposition of these assembled units permitting the gearing from the motor to the counter to consist of a bevel pinion on the output shaft meshing with a bevel gear on the drive shaft; by which construction all of the parts can be, and as shown are, accommodated within an extremely small space. In accordance with another preferred feature the front access to the resetting elements of the counter is provided by means of a manual reset wheel connected to or mounted on the reset shaft of the counter, which shaft is parallel to the front face, whereby the wheel rotates in a plane at right angles to the meter face, said wheel being of sufficient diameter for its rim to protrude into front access, while the housing front wall is formed with an aperture or slot serving to permit such protrusion of the resetting wheel and afford manual access for turning the wheel and thus setting the counter back to the zero position.

Further advantageous features will be described, relating to cooperative actions of the operating parts, interrelation of fixed parts, structural arrangements facilitating manufacture and assembly and others, as will appear.

Figure 2:
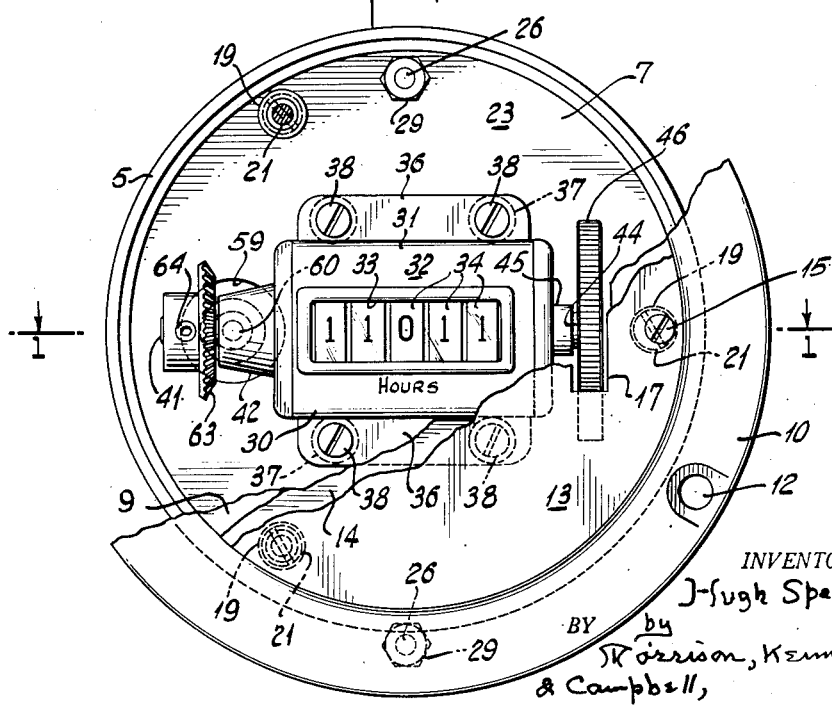

In the accompanying drawings, Fig. 1 is a central sectional view, looking downwardly, taken on the line 1—1 of Fig. 2, of a running-time meter embodying the present invention; with certain interior parts shown in full view, and the relation of the instrument to an upright panel on which, for example, it may be mounted, being indicated; a means of clamping the instrument in place on the apertured panel being assumed, such as that illustrated in the prior patent of R. F. Knight No. 2,193,820 of March 19, 1940.

Fig. 2 is a front elevational view of the same, partly broken away to disclose interior elements, and shown as it would appear when positioned and fixed within a hole provided for the purpose in a suitable panel.

Referring particularly to the illustration of the invention shown in the drawings, the instrument comprises a general frame, preferably in the form of a closed housing composed of a dielectric or plastic material, the main part of which consists of the cylindrical housing wall or sleeve 5, the axis of which may be horizontal. At one end the cylindrical wall is closed by a back wall 6. For the interior support of various parts an intermediate wall or base plate 7 is provided, this constituting a partition which separates the interior into two spaces. The cylindrical housing wall 5 may be built up, for convenience in assembling, by composing it of two half length pieces interconnected by an overlapping circumferential joint 8 as shown in Fig. 1, improving access and assembling.

Shown at the front end of the casing wall 5 is secured fixedly a front plate or wall 9, which may be considered as the closing cover of the walled housing. This cover plate or wall is formed with an outwardly extending flange 10 adapted to bear against the front face of a fixed upright panel 11. Such an instrument panel may be of conventional kind, with perforations or circular holes for the mounting of various instruments; and the panel may consist of an upright slab, although for certain uses the panel might be changed to another posture, such as horizontal. The cover flange 10 is shown formed with a plurality of small screw holes 12, by which the instrument or meter may be secured in place upon the panel; or instead thereof the meter may be secured in the manner already suggested by means of a clamping device engaging the back side of the panel and the peripheral wall of the meter.

At the central part of the front wall or cover 9 of the housing is provided a circular plate 13 which may be considered to be a dial, carrying convenient markings and inscriptions. As will be seen from the drawing the central part of the cover-wall is open to accommodate other parts, the instanding portion or body of the front wall giving support to the dial plate 13, and to a gasket or filler layer 14 interposed between the dial plate and the front wall, with two or more attaching screws 15 passing through the dial and the gasket and into the body of the front plate. The dial or central plate 13 at the front of the instrument is formed at its central part with an opening or window 16, suitably located to show the exposed numbers of the counter to be described; and to one side of the window 16 is a narrow aperture or slot 17 to accommodate the rim of the counter-resetting wheel to be described.

The intermediate or partition wall 7, serving as an interior frame base, may be mounted fixedly within the walled housing in various ways. A convenient way of removably mounting this baseplate, as a part of the frame comprising it and the coverplate 9, along with their carried elements, consists in providing screw or similar connections to both end walls of the housing thereby holding also said walls in place and integrating the housing. For example, instanding from the coverplate 9, are shown rigid posts or struts 19, three being indicated, spaced around the periphery, each extending inwardly toward wall 7, to such a distance, supplemented by a spacer sleeve 19$^a$, as to determine the desired position of the base wall or partition. The three posts 19 have threaded bores 20, and for each of them there is a machine screw or bolt 21 which is passed frontwardly through a lock washer and thence through the circular baseplate and through the spacing sleeve and finally into the threaded bore of the post. When the three screws are tightened this affords a rigid attachment of the partition wall to the front end wall; the former in effect dividing the interior space of the instrument into front and back compartments 23 and 24 to accommodate respectively the counter and the motor. The remaining mountings of the base wall 7 in the housing will be described after referring to the counter 30 and its mounting in the front compartment 23.

The indicating counter or registering unit 30 may be of any standard or other kind, such as a conventional revolution counter, so long as it has the characteristics required for the purposes of the present invention, as will be set forth. A typical counter suitable and used for such purposes is one marketed by Veeder-Root Incorporated, such as the type or style designated as small reset counters. The interior mechanism by which the drive causes the progressive advance of the indicated numbering at the dial, being of a conventional kind, is not herein illustrated, sufficient of the parts of such a counter being herein illustrated to afford an understanding of the present invention.

The revolution counter 30 comprises a casing 31 enclosing the operating mechanism. Its upright front wall 32 is at the middle of the meter dial, and at its central part is formed an opening 33 providing a window for viewing the rims of a series of number-carrying disks or wheels 34. With five such disks, as shown, operated methodically, e. g. to add one unit to the disclosed number for each shaft revolution, the number of hours or other time intervals can be counted and indicated up to the number 99999, one further actuation bringing the reading to zero or 00000, representing 100,000 time units. Subsequent continued operation commences with the number 1 for the beginning of a new series of indications.

The counter 30 may be variously mounted upon the partition wall 7. For example, its casing may have upper and lower back flanges 36, whose ends make contact with four spacing members or sleeves 37 which bear also against baseplate 7. Attaching screws 38 pass through lock washers 39 and thence through flanges 36 and through the tubular spacers 37 into threaded engagement with the wall 7. Thereby the counter is securely mounted with its front wall 32 in a vertical plane adjacent to that of the front housing wall 9. The numeral disk rims thus show through the window openings 16 and 33.

The making fast of the housing front wall 9, and with it the base wall 7 and carried parts, to the front edge of the cylindrical wall 5 may be done in different ways, as by screws extended rearwardly through holes in the wall 9 and into tapped bores in the wall 5; but the following preferred indirect mode of securing the assembled parts tightly in place has constructional advantages. This plan includes applying a permanent backward pull upon the interior partition plate 7, this acting through the bolts 21 and posts 19 to draw rearwardly also the front wall 9, which is thus held tightly to the housing wall 5. Such a unifying function is shown performed by the following means.

At its back side the base wall 7 carries a plurality of backwardly extending posts 28, upper and lower being shown, these being hexagonal and hollow, each being formed at its back end with a threaded bore 25. Each of these posts may be composed of metal, rather than of plastic material as are the previously described posts 19 that are integral with the front cover wall 9. The rigid attachment to the base 7 of the posts 28 is afforded by forming each of them with a reduced and threaded front end 26, this being passed through a hole in the base wall and at its front end, beyond the base, through a lock washer 22 and thence being engaged and clamped by a nut 29 tightened against the washer and wall. For mechanically connecting the two threaded hollow posts 28 with the housing back wall 6 there are provided two long machine screws or headed bolts 27, their shanks extending frontwardly for engagement in the threaded bores 25 of the posts. The back wall is formed with an exteriorly accessible recess 6ª within an internal boss of the wall, thereby to accommodate each of the screw heads, so that they will not project. Instead of extending the threaded posts 28 clear back to the wall 6, they are shown as extending only part way; and between the rear ends of the posts and the back wall extend the screws 27 which when tightened maintain tension, and this rigidifies the entire structure, the bolts pulling the wall 7 into position and the cover wall being pulled tightly against the peripheral edge of the housing.

Returning to the revolution counter 30 per se, its shafts which extend beyond the counter casing to exterior points comprise, first, a driving shaft 41 which extends horizontally and parallelly to the front face of the meter and panel and extends through a fixed bearing or boss 42 at the lefthand end of the counter, and second, a reset shaft 44, also shown horizontal and parallel to the front face, passing through a bearing boss 45 at the righthand end of the counter housing. The connections to actuate the driving shaft will be described later. The reset shaft is shown as carrying a reset wheel 46, which turns in a plane at right angles to the front face of the instrument and is of ample diameter to protrude frontwardly into manual access so that the knurled rim of the wheel may readily be turned by a person in front of the panel, a single turn of this wheel sufficing, in a conventional way, to restore all of the number disks 34 to a designated initial or zero position. The resetting hand wheel 46 is shown of an ample diameter for its rim actually to project frontwardly, through the dial aperture 17 and for effective manual resetting adjustment afront the panel slab and meter dial.

The counting unit 30 is thus disclosed as a pre-existing unitary sub-instrument located interiorly, close to the front of the main instrument or meter; adapted for example to make one count per revolution of its driving shaft, and one revolution or count per hour, and of a character to add one count or number per turn whichever direction the counter drive shaft may turn. Such counters usually carry a small knob on the reset shaft-end for finger and thumb turning of the same, but which would not be operative from the meter front as is the wheel 46 with its protruding operating rim of this invention.

Coming to the synchronous motor 50, contained within the second or back compartment 24, this sub-instrument, like the counter 30, may be a standard and preexisting type of synchronous motor, of unitary character and contained within its own housing. It constitutes the actuating unit for the counting unit of the invention. It is preferably of the self starting kind, turning steadily in synchronism with clock time. Such motors are conventionally put out containing the electromagnetic means and, in train with the motor shaft, suitable speed reduction gearing, bringing the relatively high speed of the motor down to a relatively low speed, more suitable for many purposes and delivering proportionately greater operating power or torque, depending upon the particular reduction gearing applied to the motor and its speed-reduction ratio. So common is this practice that the reduction gearing has come to be considered as a part of the synchronous motor, rather than a part of the devices beyond, which are driven from the final or output shaft of the built-in reduction gearing of the motor. The detail features of such motors and reduction gearings are so well known that a showing thereof is unnecessary for an understanding of the present invention; but as convenient illustrations of such motors reference may be made to the following patents showing such motors, with reduction gearing, marketed by R. W. Cramer Company, namely: Patent No. 2,334,040 granted November 9, 1943; applications Serial No. 623,558 filed October 20, 1945, and Serial No. 720,371 filed January 6, 1947 now Patents Nos. 2,436,231 dated February 17, 1948 and 2,492,197 dated December 27, 1949, respectively.

The casing of the synchronous motor 50 is shown as comprising three sub-casings or sections, including the motor casing 51, being the primary casing and containing the electromagnetic elements; and the extension or secondary casing section 52 in which may be electromagnetic elements or gearing elements or both; and the third or gear casing section 53; these being permanently interconnected. For mounting the motor within the back compartment 24 its frontmost casing section 53 is shown formed with an outstanding flange 54, this being a front flange mounted closely against the back side of the partition 7. The flange 54 has a plurality of screw holes, which may be formed in outstanding ears, and through each of these holes extends frontwardly a machine screw 55, with a lock washer between the screw and the casing flange; the screw thence passing into a threaded bore in the partition; so that the tightening of these screws 55 mounts the entire motor 50 rigidly and fixedly upon the back side of the partition wall.

The electrical connections for energizing the motor are shown as comprising a pair of terminal lead wires 57, issuing from one of the sections of the motor casing, from which other connections may lead to accessible points in a conventional way, the main outer casing part 5 or 6 for example being provided with binding posts or screws connected with the motor terminal wires and adapted to have the exterior circuit wires thus connected thereto, for bringing A. C. current to the motor. Such a circuit is indicated, at 57 in Fig. 1, with a switch 58 by which the circuit is closable or openable to put the meter into or out of operation.

Referring next to the operative interconnection from the motor 50 to the counter 30, these connections, which must be compact, may extend through a hole 59 formed near the lefthand edge of the partition wall 7. The motor reduction gearing within the casing section 53 terminates, as usual, in an output shaft 60, which is the shaft of the final gear in the gear train. Said shaft 60, passing through the partition plate hole 59, thus reaches into the front compartment 23 to the point where it is geared for the actuation of the driving shaft 41 of the counter unit. An effective construction, which is also simple and facilitates assembling, is as shown; the output shaft 60 carrying a bevel pinion 61 which is secured fast to the output shaft by a set screw 62. Said bevel pinion is shown as meshing with a bevel gear 63 which is made fast by a set screw 64 upon the counter driving shaft 41. As a detail promoting compactness the gear 63 has its teeth facing toward the counter 30, so that the pinion 61 is nicely accommodated in the space between the counter housing and the gear 63. Another advantage in employing a smaller gear or pinion on the output shaft than the gear 63 on the driving shaft is that this introduces a further reduction of rotary speed; this gearing 61, 63, of course being coordinated with the reduction gearing embodied in the motor so as to deliver to the driving shaft of the counter the desired speed, such as one count or revolution per hour, or per minute, or any other time unit. The described interconnecting gearing between the motor and the counter is characterized in that the first or motor output shaft thereof stands at about right angles to the counter driving shaft and to the front face of the meter, whereas the driving shaft stands parallel to the front face; by which arrangement the motor output shaft and its carried bevel pinion reach frontwardly into effective driving position in relation to the bevel gear of the counter driving shaft.

The operation of the above described structure of meter has been sufficiently described at various points in the specification. Whatever be the operation or event the running time of which is to be registered, such as a test of the performance of a machine, the switch 58 will be thrown at the selected starting point of time in order to put the synchronous motor into action, this starting the counter, preferably from its zero position, to indicate a single count with each unit of time; the switch to be opened and actuation to cease at the regular or variable termination of the operation being metered, so that the counter may then be read to show the duration of time which has elapsed; and if desirable the metering action may be resumed after a pausing interval in the operation being measured, so as to add to the reading the additional time or times of operation, integrating the same into a final total of running time or, if preferred, of inactive periods between runs.

The described meter is not only simple and compact but is readily assembled into a unitary instrument and disassembled, as will be perceived by considering the preferred assembling steps, recited as follows: (1) Starting with the partition wall 7 as a base the motor 50 is bolted to the back side of it, with its output shaft 60 projecting frontward through partition hole 59; and (2) the counter 30 is bolted to the front side of the base or partition with its driving-shaft gear 63 in mesh with the pinion 61 on the output shaft. (3) The three interior posts 19, extending backwardly from the front or cover wall 9, are now aligned with the positions of the three screws 21, and said screws are inserted through the base wall 7 and through the spacing sleeves 19ª and into the threaded bores of the posts; when tightened, the inside frame is established, comprising the base and front walls spaced apart by the posts and sleeves, the base wall already carrying the motor and counter. (4) This general interior assembly may now be inserted into the front of the housing 5, 6 until the cover 9 contacts the housing front edge. (5) The two opposite screws 27, having been inserted through the back wall and through the recesses 6ª, are now engaged in the threaded bores 25 of the already attached hollow posts 28, and the screws are tightened to draw home the base and front walls, this operation drawing together and clamping the two-part housing wall 5 and consolidating rigidly the entire assembly. No separate attachment of cover 9 to housing 5 is necessary. (6) Before inserting the inside assembly into the housing, the electrical inside circuit for the motor is arranged and connected, with outlets to the outside A. C. circuit, controlled by a suitable means, represented by the switch 58. (7) To complete the meter, the dial plate 13 is attached upon the front side of the cover 9, so as completely to overlie the entire middle area of the cover, thereby to conceal the counter, except at its center where the registering numerals show through the window 16; the resetting wheel 46 protruding through the slotted aperture 17 in the dial. The entire instrument is now ready to be mounted upon the upright panel 11, where it may be secured either by screws through the outflange 10 of the cover wall or by a clamp means as already referred to.

What is claimed is:

1. A housed, self-contained and portable running-time meter bodily mountable, as on a panel, and containing as independent units a synchronous electric motor having an output shaft and a revolution counter having an operating shaft, the meter housing consisting of a peripheral wall extending longitudinally between its back and front end walls which end walls are relatively movable longitudinally for access and assembling purposes, and the front wall being formed with a window opening for viewing the counter indicating means; and in combination therewith an interior transverse partition or cross wall constituting a frame member separate from the housing walls and located about midway between said end walls thus dividing the housing space into a front compartment accommodating the counter unit and a back compartment accommodating the motor unit, and formed with a connecting aperture between compartments; a set of longitudinal spacing members or posts extending from the front wall to the partition and rigidly interconnecting and relatively positioning the two; a set of longitudinal holding members or posts extending from the partition to the back wall and interconnecting the two, and having accessible tightening means as bolts operable for final unifying of the meter; the motor unit being attached fixedly upon the back face of the partition in position with its output shaft projecting beyond the motor body and extending longitudinally frontward through the partition aperture into the front compartment; and the counter unit being attached fixedly upon the front face of the partition in position with its operating shaft projecting beyond the counter body and parallel to the front wall and its indicating means viewable through said window opening; and transmitting connections from said motor output shaft to the counter operating shaft comprising bevel gears thereon brought into mesh by the attaching of the motor and counter units upon said partition.

2. The meter as in claim 1 and wherein the bevel gear on the counter shaft has its teeth facing inwardly toward the counter body, and the gear on the motor shaft is smaller and compactly located between the counter body and its shaft gear.

3. A housed and self-contained running-time meter containing as separate units a synchronous electric motor and a revolution counter, the meter housing consisting of a peripheral wall with end walls relatively movable longitudinally during assembling, the front wall being formed with a window opening for viewing the counter; an apertured transverse partition or cross wall located or suspended intermediate between said end walls thus dividing the housing space into front and back compartments accommodating respectively said counter unit and said motor unit; longitudinal spacing struts or posts extending from said front wall to said partition and rigidly interconnecting and relatively positioning the two; longitudinal holding stays or posts extending from said partition to said back wall and interconnecting the two, and having accessible means as screws operable to tighten and unify the meter; said motor unit being attached to the back face of said partition in position with its output shaft extended longitudinally frontward through the partition aperture; and said counter unit being attached to the front face of said partition in position with its operating shaft parallel to the front wall; and transmitting connections from the motor output shaft to the counter-operating shaft comprising bevel gears thereon in mesh within the front compartment.

4. The meter as in claim 3 and wherein the counter unit has also a reset shaft parallel to the front wall, a manual thumb wheel fast on said reset shaft to rotate in a plane at a right angle to the front wall and of ample diameter to protrude slightly beyond the front wall into convenient accessibility, and the front wall having an aperture or slot accommodating the protrusion of the thumb wheel.

5. A self-contained running-time meter, comprising an interior partition or frame piece and mounted thereon a revolution counter unit having numeral disks, a driving shaft from which such disks are operated and a front dial at which the disk numerals are readable; and a synchronous motor unit also mounted on said frame piece rearwardly adjacent to said counter, having a reduced-speed output shaft; and means to drive said counter from said motor comprising a geartrain extending from the motor output shaft to the counter driving shaft; together with a fore-and-aft-extending housing to enclose the frame and carried elements having a peripheral wall and a closing back wall; said frame comprising a front wall constituting a cover to the housing and said interior partition, with means rigidly but removably interconnecting said front wall and partition in spaced relation comprising posts or struts bolted thereto; means removably mounting the counter and motor respectively to the front and back sides of said partition; the assembly of front and partition walls and the attached counter and motor being adapted to be inserted and positioned as a whole within the housing, and securing means adapted to pull backwards said assembly within the housing and fix it there in such manner that said front wall bears against and closes the front end of the housing peripheral wall.

6. A running-time meter, self-contained and mountable as on a panel, and comprising an interior frame piece or partition, and removably mounted thereon an encased revolution counter unit having a visual indicating means and having a driving shaft from which said indicating means are operated, and having a front wall with opening at which said means are readable; and an encased synchronous electric motor unit removably mounted on said frame piece adjacent to said counter, the same having a reduced-speed output shaft, with a circuit having a switch means to throw the motor and thereby the meter into or out of action; and gearing to transmit drive from said motor to said counter comprising a gear-train extending from the motor output shaft to the counter driving shaft; whereby, through the cooperation of said motor unit and said counter unit, the meter measures off the running time and the counter registers the elapsed time of an operation or running mechanism.

HUGH SPENCER.

REFERENCES CITED

The following references are of record in the file of this patent:

UNITED STATES PATENTS

| Number | Name | Date |
|---|---|---|
| 1,181,306 | Graham | May 2, 1916 |
| 1,458,509 | Arthur | June 12, 1923 |
| 1,557,721 | Passamaneck et al. | Oct. 20, 1925 |
| 1,703,491 | Kirner | Feb. 26, 1929 |
| 2,233,368 | Newman | Feb. 25, 1941 |
| 2,398,015 | Leathers | Apr. 9, 1946 |